United States Patent [19]
White

[11] 4,097,190
[45] Jun. 27, 1978

[54] WIND MOTOR

[76] Inventor: Herbert O. White, 4242 E. Wilshire Dr., Phoenix, Ariz. 85008

[21] Appl. No.: 734,390

[22] Filed: Oct. 21, 1976

Related U.S. Application Data

[63] Continuation-in-part of Ser. No. 641,390, Dec. 17, 1975, abandoned.

[51] Int. Cl.² .............................................. F03D 3/02
[52] U.S. Cl. ..................................... 416/117; 416/19; 416/111
[58] Field of Search .......... 416/110, 111, 78, 117–119, 416/19

[56] References Cited
U.S. PATENT DOCUMENTS

| 1,086,611 | 2/1914 | Paddock | 416/108 |
|---|---|---|---|
| 1,560,024 | 11/1925 | Dennhardt | 416/108 |
| 1,786,057 | 12/1930 | Fales | 416/19 |
| 1,812,814 | 6/1931 | Van Lammeren | 416/111 |
| 2,437,346 | 3/1948 | Bourne | 416/117 X |

FOREIGN PATENT DOCUMENTS

| 865,280 | 2/1953 | Germany | 416/119 |
|---|---|---|---|
| 963,229 | 5/1957 | Germany | 416/19 |
| 1,076,588 | 2/1960 | Germany | 416/19 |
| 47,122 | 3/1918 | Sweden | 416/119 |

*Primary Examiner*—Everette A. Powell, Jr.
*Attorney, Agent, or Firm*—Don J. Flickinger; John A. Robertson

[57] ABSTRACT

A wind driven blade is pivotally carried by a rotatable crank arm. The blade rotates relative the crank arm from a position perpendicular to the wind during the power stroke to a position parallel to the wind during the return stroke. The moving mass is dynamically balanced to provide a self-contained single blade modular unit. A selected number of the modular units are adjoinable to form a multi-blade wind motor in which any given module may be functionally disconnected.

10 Claims, 20 Drawing Figures

WIND MOTOR

The instant application is a continuation-in-part application to the common inventor's prior filed copending U.S. patent application Ser. No. 641,390, filed Dec. 17, 1975, entitled "Wind Motor", now abandoned.

This invention relates to wind driven devices.

More particularly, the instant invention concerns a wind motor of the impellar type.

In a further aspect, the present invention concerns a wind motor having a cyclically feathering wind propelled blade arrangement.

The prior art is replete with various wind driven propeller type apparatus alternately referred to as wind wheels or wind motors. Briefly, the devices include a plurality of blades carried by a rotatable wheel-type frame. The blades extend perpendicular from the face of the frame and are equally spaced on a circle concentric with the axis of roatation thereof. The physical appearance is suggestive of the well known paddle wheel, with each successive blade following the path of the previous blade as the frame rotates.

In accordance with conventional practice, each blade is movable and provided with means for automatic feathering. As the frame rotates, each blade moves between working position at one point during revolution of the frame and a feathered position at 180° rotation of the frame. At the working position, the blade receives the force of the wind generally perpendicular to the side thereof to urge rotation of the frame. Subsequently, during the feathered position, the edge of the blade is presented to the wind as the blade moves against the wind.

The appeal of a wind motor is rather obvious. The devices are relatively maintenance free and do not require any expenditure for fuel. Useful work is supplied during times of blowing wind. Therefore, a wind motor can be erected, coupled to intermittently supply a stored work product and generally last unattended. Examples of work product which can be intermittently produced and stored are the generation of electricity, which is stored in a battery, and pumping water, which is stored in a reservoir.

The impeller type wind motor offers certain advantages over the propeller type wind motor. The large sail type blades associated with the impeller type are more susceptible to wind movement and, as a result, are functional as a result of wind velocities which are below the required minimum for propeller type motors. In a given space the impeller type has several times the wind gathering capability of other types. Further, the impeller type can function at somewhat slower speeds, thereby reducing wear on rotating parts, such as bearings, and yet provide greater torque output.

In order to obtain increased propeller output, the prior art has provided impeller type wind motors having a plurality of blades or sails. Generally, the devices utilize four, six or eight blades. As previously noted, the blades are arranged such that at the point one blade is perpendicular to the direction of the wind, the diametrically opposed blade is parallel to the wind. The other blades are at varying angles, either in the process of being feathered, or returning to full power. A study of the blade arrangement with respect to wind flow reveals various inherent limitations.

It is first seen that each blade operates at substantially reduced efficiency. For example, the blade which is instantly perpendicular to the wind flow is shielded by the subsequent blade to receive wind over approximately 50 percent of the area. The blade preceding the perpendicular blade is shielded over all of the area thereof by the subsequent two blades. Considering wind flow about the blade, each blade operates in a reduced pressure due to the wind eddy created by the subsequent blade. Further, wind can actually be deflected by some blades to strike the backside of other blades and thus provide a force counter to the direction of rotation.

Conventionally, prior art wind motors are provided in accordance with predetermined design criteria. The criteria is changeable from unit to unit, however, it is fixed within a given unit. Each wind blade has a finite area and the number of blades within a unit is fixed. The several blades within the unit are arranged to be integrally co-functional. It is impossible, therefore, to perform an operation, such as maintenance or repair, on a single blade without rendering the entire unit unserviceable. Also, the power output relative the wind remains constant. That is, if slightly more or less power output is desired, the unit must be discarded in favor of another of appropriate size.

It would be highly advantageous, therefore, to provide an improved wind motor.

Accordingly, it is a principal object of the present invention to provide an improved wind motor of the impeller type.

Another object of the invention is the provision of a wind motor in which each blade is fully exposed to the wind.

Yet another object of the invention is to provide a wind motor which is capable of bi-directional rotation.

Still another object of the instant invention is the provision of a wind motor having a plurality of blades which are arranged such that each blade is independent of the influence of wind deflection or movement relative another blade.

Still another object of the invention is to provide a wind motor which may be manufactured with varying numbers of blades.

A further object of the present invention is the provision of a blade configuration which will provide a self-starting wind motor.

And a further object of the invention is to provide a wind motor which can be manufactured with various speed and torque multiplication factors.

And a still further object of the invention is the provision of a wind motor of the above type which is durably constructed and relatively inexpensive to manufacture.

Yet a further object of the invention is to provide of a modular wind motor concept whereby a selected number of independently functioning modular units can be associated to provide a wind motor of desired size or configuration.

A still further object of the present invention is to provide a multi-blade wind motor in which each given blade can be selectively disassociated without impairing the function of related blades.

Briefly, to achieve the desired objectives of the present invention in accordance with a preferred embodiment thereof, first provided is a radially rotatable crank arm carried by a stationary frame. A wind blade is carried by the crank arm and rotatable about an axis spaced from and parallel to the axis of rotation of the crank arm. Timing means maintain a predetermined ratio retween the speed of rotation of the wind blade and the speed of rotation of the crank arm. A drive shaft is carried by the frame and rotates in response to rotation of the crank arm.

In a single blade configuration, means are provided for dynamic balance of the moving mass. In an alternate embodiment, a second crank arm and wind blade replaces the counterbalance. The second wind blade is placed in tandem relative the first wind blade. In the two blade configuration, respective first and second components rotate at equal speed and are cyclically diametrically opposed.

In yet another alternately preferred embodiment of the instant invention, a selected number of the single blade units can be functionally joined in modular fashion to provide a multi-blade wind motor. Since each blade of the multi-blade wind motor is a self-contained modular unit, any selected blade and associated mechanism may be disconnected from the wind motor for replacement or other service, without withdrawing the entire unit from service. The several modular units of the multi-blade motor are commonly connected to a single power output shaft.

The foregoing and further and more specific objects and advantages of the present invention will become readily apparent to those skilled in the art from the following detailed description, thereof taken in conjunction with the drawings, in which:

Figure 1:
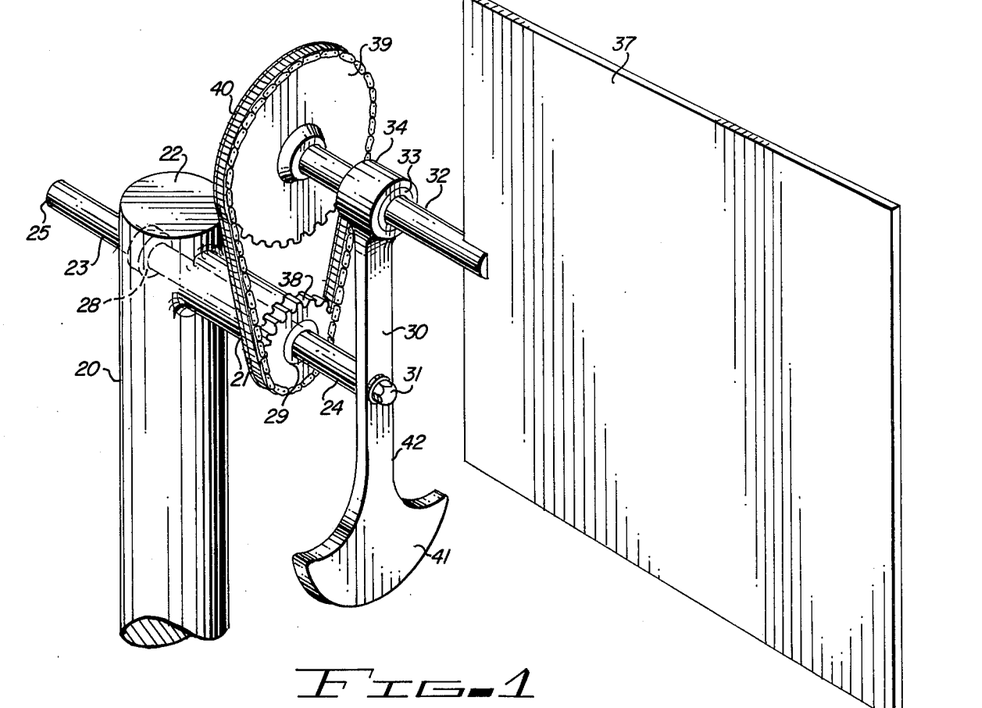
FIG. 1 is a perspective view of a wind motor constructed in accordance with the teachings of the present invention.

Turning now to the drawings in which the same reference numerals indicate corresponding elements throughout the several views, attention is first directed to FIG. 1 which shows a single blade embodiment of a wind motor constructed in accordance with the teachings of the instant invention. A stationary frame is represented by upright support member 20. Although not herein specifically illustrated, it will be appreciated by those skilled in the art that the lower extreme upright support member 20 is provided with a suitable base or otherwise secured to an appropriate platform. Tubular projection 21 extends radially perpendicular from upright support member 20 proximate the upper end 22 thereof. Drive shaft 23, having first and second ends 24 and 25, respectively, is carried by the stationary frame and journalled for rotation about the longitudinal axis thereof in bearings 28 and 29 within upright support member 20 and tubular projection 21, respectively.

Crank arm 30 is secured to first end 24 of drive shaft 23 by bolt 31 extending through crank arm 30 and threadedly engaging a suitable female threaded portion within end 24. It is noted that crank arm 30 rotates radially about a first axis which, in accordance with the instant embodiment, is the longitudinal axis of drive shaft 23. For positive rotation between crank arm 30 and drive shaft 23, crank arm 30 is keyed or otherwise affixed to drive shaft 23 for the prevention of slippage therebetween in accordance with conventional methods well known in the art. Second end 25 of drive shaft 23 provides for a power take-off for coupling to selected apparatus for performing useful work.

Idler shaft 32 is rotatably journalled in bearing 33 proximate the free end 34 of crank arm 30. Idler shaft 32 rotates about the longitudinal axis thereof which defines a second axis spaced from and parallel to the first axis. Wind blade 37 is secured to idler shaft 32. For reasons which will be hereinafter explained in detail, wind blade 37 is symmetrical about the axis of idler shaft 32 and has a wind receiving face on either side thereof.

A first sprocket 38 is solidly affixed to tubular projection 21. A second sprocket 39 is solidly affixed to idler shaft 32. Positive drive chain 40 extends about and is drivingly engaged with first sprocket 38 and second sprocket 39.

From the foregoing detailed description of FIG. 1, it is seen that, as crank 30 rotates about the first axis, blade 37 rotates about the second axis. Sprockets 38 and 39 and chain 40 provide timing means for maintaining a predetermined ratio between the speed of rotation of wind blade 37 and the speed of rotation of crank arm 30. In accordance with a preferred embodiment of the invention, the speed of rotation about the first axis is twice the speed of rotation about the second axis. That is, for each complete rotation of blade 37, crank arm 30 will have made two complete rotations. During rotation, crank arm 30 and the elements carried thereby are offset by counterbalance weight 41 carried by rearward extension 42 of crank arm 30.

The operation of the device of FIG. 1 will be described in detail hereinafter. Since substantial portions of the operational description are common with other embodiments of the instant invention, a detailed description of the elements of the alternate embodiments will be presented prior to functional and operational descriptions.

Figure 2:
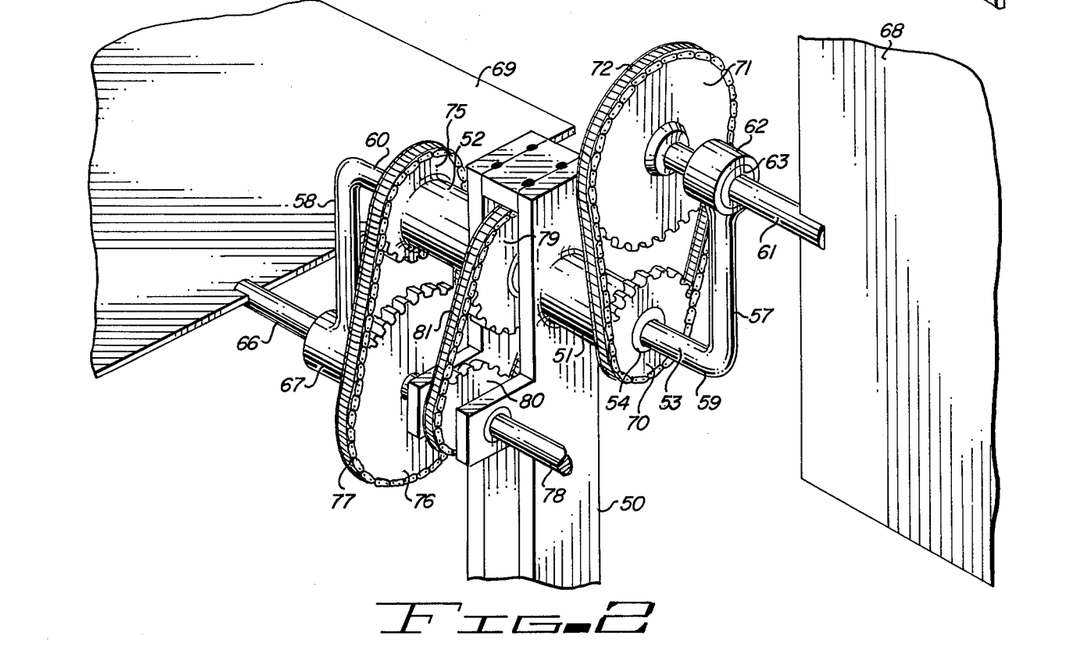
FIG. 2 is a partial perspective view of an alternately preferred embodiment of the instant invention.

Referring now to FIG. 2, stationary frame member 50 includes diametrically opposed tubular projections 51 and 52. Intermediate shaft 53 is rotatably journalled within tubular projections 51 and 52 by bearing 54 (bearing 54 and tubular projection 52 not herein specifically illustrated). First and second crank arms 57 and 58 are carried by first and second ends 59 and 60, respectively of intermediate shaft 53. Crank arms 57 and 58 are rotatable with intermediate shaft 53, the longitudinal axis of which is defined as the first axis.

First idler shaft 61 is carried by the free end 62 of first crank arm 57 and is rotatively journalled for rotation of the longitudinal axis thereof in bearing 63. The longitudinal axis of first idler shaft 61 is a second axis spaced from and parallel to the first axis, longitudinal axis of intermediate shaft 53. Second idler shaft 66 is similarly rotatably carried by the free end 67 of second crank arm 58. First and second wind blades 68 and 69 are carried by first idler shaft 61 and second idler shaft 66, respectively.

Sprocket 70 is solidly affixed to tubular projection 51 and is concentric with the longitudinal axis of intermediate shaft 53. Sprocket 71 is concentrially affixed to first idler shaft 61. Positive drive chain 72 encircles and drivingly engages sprockets 70 and 71. Sprockets 70 and 71 and chain 72 provide first timing means between the speed of rotation of first wind blade 68 and first crank arm 57. In a similar arrangement, sprockets 75 and 76 and chain 77 carried by projection 52 and second idler shaft 66 provides second timing means for maintaining a predetermined ratio between the speed of rotation of second wind blade 69 and the speed of rotation of second crank arm 58.

It is particularly noted that first wind blade 68 is in tandem with second wind blade 69. The term tandem as specifically used herein refers to two rotating items in juxtaposition along parallel or mutual axes of rotation. Wind blades 68 and 69 are further uniquely relatively positioned as demonstrated by crank arms 57 and 58, which, having a common axis of rotation are fixed to remain diametrically opposed. Further, wind blade 69 about the axis thereof 90° from the radial direction of wind blade 68. The latter arrangement is maintained by the first and second timing means which rotate wind blades 68 and 69, respectively, at equal speeds relative crank arms 57 and 58.

Drive shaft 78 is carried by frame member 50 journalled for rotation about the longitudinal axis thereof. Drive sprocket 79 carried by intermediate shaft 53 supplies power to driven sprocket 80 carried by drive shaft 78 through drive chain 81. The longitudinal axis of drive shaft 78 defines a third axis spaced from and parallel to the first and second axes. This differs from the embodiment of FIG. 1, wherein the first and second axes were coincident, as were the intermediate shaft and the drive shaft.

Figure 3:
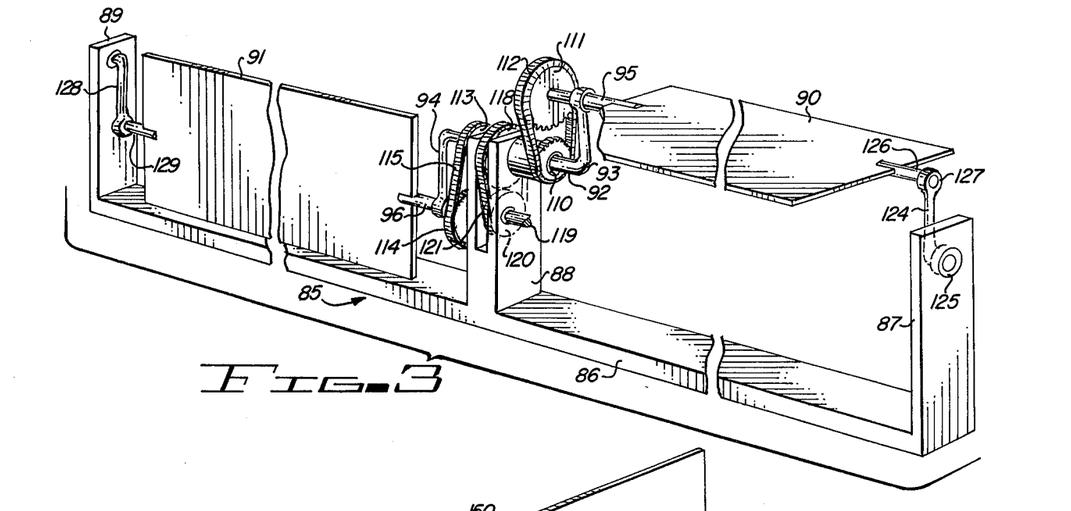
FIG. 3 is a broken perspective view of another alternately preferred embodiment of the present invention.

Stationary frame 85 of the embodiment of FIG. 3 includes an elongate base member 86 having spaced upright support members 87, 88 and 89. Between upright support members 87 and 88 and between upright support members 88 and 89, are tandemly placed wind blades 90 and 91, respectively. Intermediate shaft 92 is rotatably supported in intermediate upright support member 88 and carried diametrically opposed first and second crank arms 93 and 94. First idler shaft 95 and second idler shaft 96 are rotatably carried by first crank arm 93 and second crank arm 94, respectively. First timing means including first pulley 110, second pulley 111 and chain 112 provide timing between the rotational speed of first wind blade 90 and first crank arm 93. Second timing means including sprockets 113 and 114 and chain 115 provide timing between second wind blade 91 and second crank arm 94. Drive sprocket 118 is carried by intermediate shaft 92 and provides driving force to drive shaft 119 through driven sprocket 120 and chain 121.

The components carried by an associated upright support member 88 have equivalent counterparts described in detail in connection with the description of FIG. 2. Therefore, further explanation would appear to be redundant.

First auxiliary crank arm 124 is rotatably journalled in bearing 125, carried by first upright support member 87. First auxiliary crank arm 124 rotates about an axis which is common with the axis of rotation of first crank arm 93. First auxiliary idler shaft 126 is rotatably journalled with the free end 127 of first auxiliary crank arm 124. First idler arm 95 and first auxiliary idler arm 126 rotates about a common axis. The primary purpose of the assemblage including auxiliary crank arm 124 and auxiliary idler shaft 126 is to provide support for the otherwise free end of wind blade 90 and thus provide that the blade can be substantially elongate. In a similar manner, wind blade 91 is further supported by second auxiliary crank arm 128 and second auxiliary idler shaft 129.

In the embodiment of FIG. 3, as illustrated, power output is provided by drive shaft 119. In a further embodiment, drive shaft 119 could be extended to substantially the same length as frame 85 and repositioned to be remote from interfering with wind blades 90 and 91. Additional drive means corresponding to sprockets 118 and 120 and chain 121 can be employed for additional output from auxiliary crank arms 124 and 129.

Figure 4:
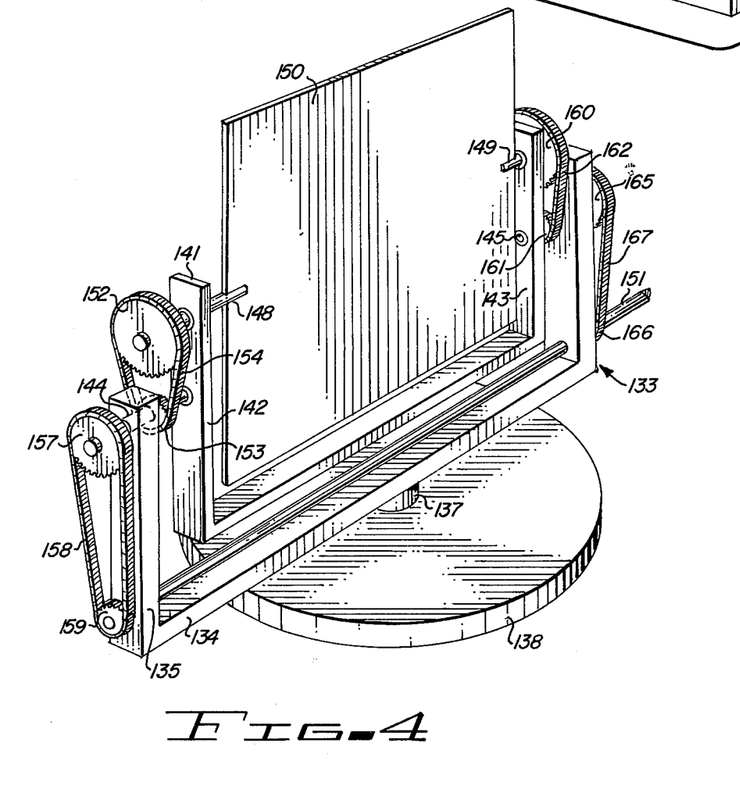
FIG. 4 is a perspective view of yet another alternately preferred embodiment of the instant invention.

As particularly seen in FIG. 4, stationary frame 133 includes an elongate base member 134 and a pair of spaced parallel support arms 135 and 136. Upright column 137 extends between base member 134 and pedestal 138. A generally U-shaped yoke 141 having legs 142 and 143 is rotatably supported in frame 133 by shafts 144 and 145. Shaft 144 is rotatably journalled for rotation about the longitudinal axis thereof in support arm 135 and solidly affixed to leg 142. Shaft 145 is rotatable about the same axis as shaft 144 and is rotatably journalled in support arm 136 and solidly affixed to leg 143. Diametrically opposed idler shafts 148 and 149 extend from wind blade 150 and are rotatably journalled within legs 142 and 143, respectively. Shafts 148 and 149 which form the axis of rotation for wind blade 150 are spaced from and parallel to shafts 144 and 145, which form the axis of rotation of yoke 141 relative stationary frame 133.

Drive shaft 151 is carried by stationary frame 133 and it is journalled for rotation about the longitudinal axis thereof, which axis is parallel to the previous named axis.

Analogous to similar embodiments, drive sprocket 152 carried by idler shaft 48, driven sprocket 153 carried by shaft 144 and chain 154 provide timing means between the speed of rotation of yoke 141 and wind blade 150. Similarly, second drive sprocket 157 carried by shaft 144, chain 158 and driven sprocket 159 engage with drive shaft 151 and provides drive means for rotating drive shaft 151 in response to rotation of yoke 141. Similar timing means including drive sprocket 160, driven sprocket 161 and chain 162 and drive means including drive sprocket 165, driven sprocket 166 and chain 167 and carried proximate leg 136 of frame 133.

Figure 5:
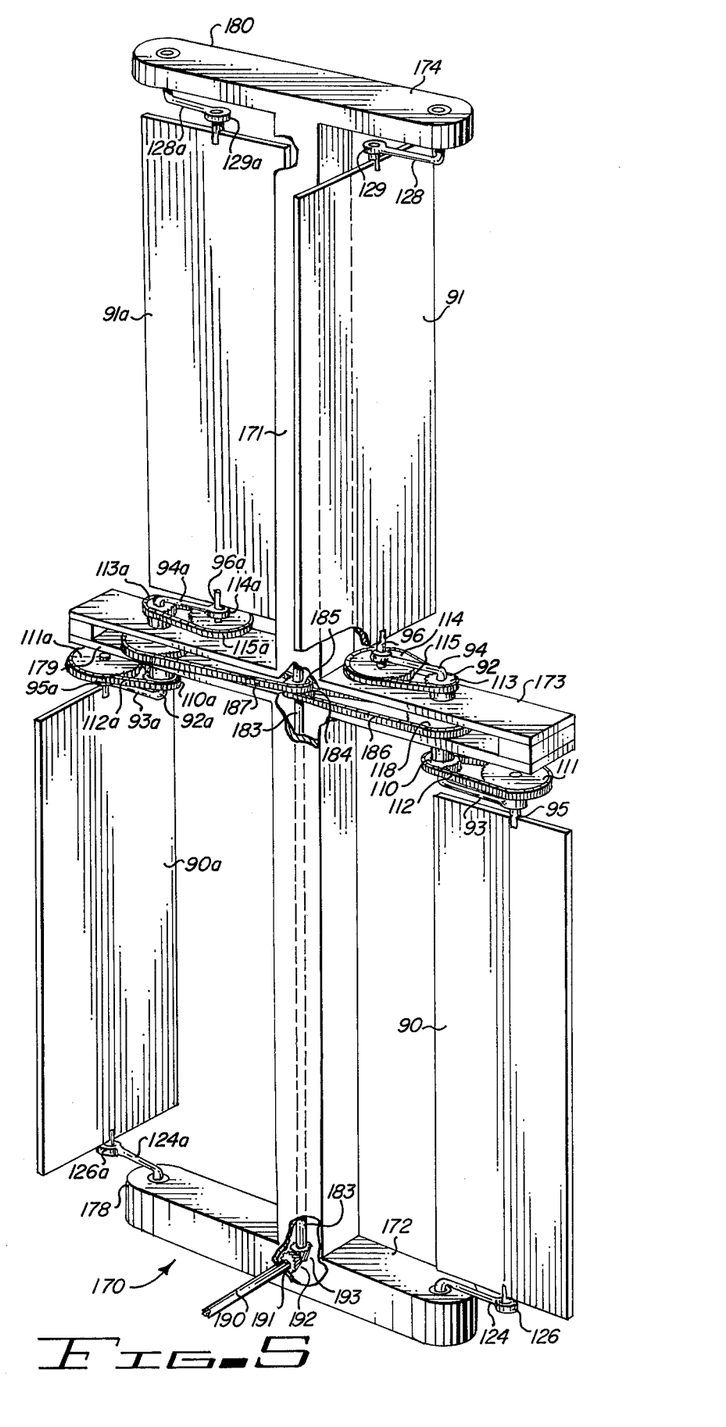
FIG. 5 is a perspective view of yet another alternately preferred embodiment of the instant invention.

The embodiment of FIG. 5 is closely related to the previously described embodiment of FIG. 3 and shares various components in common therewith. The stationary frame generally designated by the reference character 170 includes an upright support column 171 having spaced support arms 172, 173 and 174 extending from one side thereof and spaced support arms 178, 179 and 180 extending from the other side thereof.

In direct correlation to FIG. 3, wind blades 90 and 91 are arranged in tandem between support arms 172 and 173 and 173 and 174, respectively. Wind blade 90A resides between support arms 178 and 179 and is tandem to wind blade 91A carried between support arms 179 and 180. Intermediate shaft 92 is rotatably journalled in support arm 173 and carries diametrically opposed crank arms 93 and 94 respective ends thereof. Idler shafts 95 and 96 are rotatably journalled in the free ends of crank arms 93 and 94, respectively. Sprocket 111 carried by idler shaft 94 is in driving engagement with sprocket 110 stationarily affixed to arm 173 through chain 112. Sprocket 114 is carried by idler shaft 96 and is engaged with chain 115 which is also driveingly engaged with stationary sprocket 113 carried by support arm 173. Blade 90 is further supported by crank arm 124 and idler chaft 126. Additional support for blade 91 is provided by crank arm 128 and idler shaft 129. Wind blades 90A and 91A interact with shafts, crank arms, sprockets and chains corresponding to the intermediately preceding arrangement. The corresponding elements utilize the same reference chracters having the suffix A.

Drive sprockets 118 and 118A are carried by intermediate shafts 92 and 92A, respectively, and are rotatable therewith. Drive shaft 183 is rotatably journalled for rotation about the longitudinal axis thereof within upright support column 171. Driven sprockets 184 and 185 are affixed in conventional manner to drive shaft 183 for rotation therewith. Drive chain 186 connects drive sprocket 118 with driven sprocket 114 while drive chain 187 transmits rotational force from drive sprocket 118A to driven sprocket 185. Thus, it is seen that a power input is received by drive shaft 183 from each set of tandem wind blades 90, 91 and 90A, 91A.

Drive shaft 183 may extend from frame 170 for direct power takeoff therefrom. In the instant embodiment, however, the power takeoff is provided perpendicular to the axes of rotation of the other components thereof by power takeoff shaft 190 rotatably journalled in bearing 191 carried by frame 170. Power takeoff shaft 190 is rotatable about the longitudinal axis thereof which axis is perpendicular to the axes of the other rotating components of the device as exemplified by the drive shaft 183, intermediate shafts 92 and 92A and idler shafts 95, 96, 95A and 96A. Driving torque is transmitted from drive shaft 183 to power takeoff shaft 190 by bevel gear 192 carried by power takeoff shaft 190 which is in mesh with bevel gear 193 carried by drive shaft 183. It is also apparent in the embodiment of FIG. 5 that the auxiliary support crank arms 124, 128, 124A and 128A can be used to rotate drive sprockets and thus provide additional power input to drive shaft 183.

Figure 6:
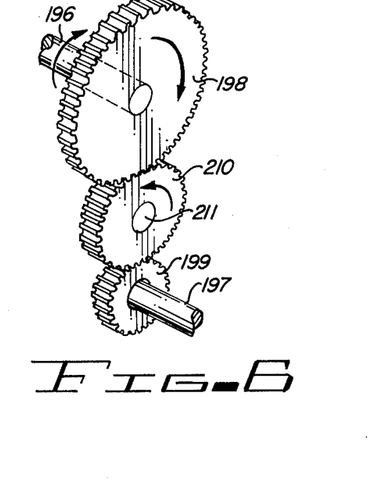
FIG. 6 is an enlarged perspective view of a timing means useful in connection with the embodiment of the invention as viewed in FIGS. 1-5.
Figure 7:
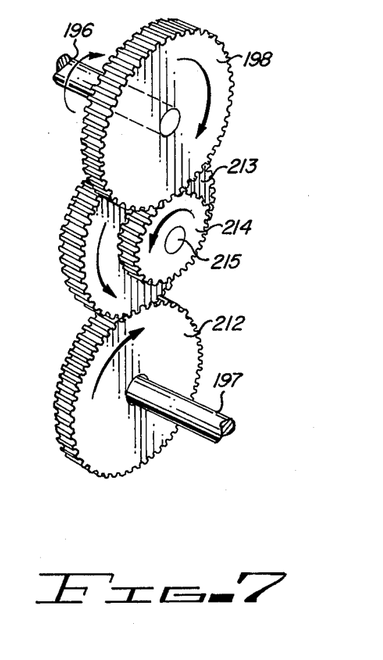
FIG. 7 is an enlarged perspective view of an alternately preferred timing means useful in connection with the previously noted embodiments of the instant invention.

FIGS. 6 and 7 illustrate alternately preferred timing means for use in connection with the embodiments of the instant invention herein previously described. Heretofore, such timing means has been characterized as a sprocket carried by the idler shaft, a sprocket carried by the frame and a drive chain mutually engaged with each sprocket. In the instant views, reference character 196 represents an idler shaft common to the idler shafts hereinbefore exemplary noted by reference characters 92, 32, 61, etc. Reference character 197 is generally representative of drive shaft 23 and intermediate shafts having previously born reference characters 53, 92 and 144.

First gear 198 is secured for rotation with idler shaft 196. Referring more specifically to FIG. 6, second gear 199 is affixed to the frame concentrically with shaft 197. Idler gear 210 is rotatably carried by idler shaft 211 carried by the support frame. First gear 198 drives idler gear 210 which, in turn, rotates about second gear 119. With respect to FIG. 7, second gear 212 is non-rotatably affixed to the stationary frame and is concentric with intermediate shaft 197. An idler gear set including idler gear 213 and 214 are rotatably carried by idler gear shaft 215. Idler gear shaft 215 is carried by the appropriate crank arm. Idler gears 213 and 214 are keyed, pinned or otherwise affixed for concurrent rotation. First gear 198 drives idler gear 214, which, in turn, causes idler gear 213 to rotate about second gear 212. It will be immediately apparent to those skilled in the art that the gear arrangements of FIGS. 6 and 7 are readily interchangeable with the previously noted sprocket and chain arrangements and provide a functionally equivalent timing means therefor.

The structure of a wind motor constructed in accordance with the teachings of the pesent invention has been described in detail in FIGS. 1–7. The operation of these embodiments are commonly analogous and will now be described in connection with FIGS. 8A through 8I. For the immediate purpose all previously described wind blades will be represented by a typical wind blade generally designated by the reference character 220 and having first and second faces 221 and 222. Wind blade 220 is rotatable about the axis of idler shaft 223 which is carried by a crank arm as previously described, but not herein illustrated. Intermediate shaft 224 is pivotally carried by the frame and provides the axis of rotation for the support arm. Timing means are graphically represented by first sprocket 225, second sprocket 226 and positive drive chain 227. For purposes of clarity of illustration, the crank arm has not been included, but always lies in a line passing through the centers of idler shaft 223 and intermediate shaft 224.

Figure 8A:
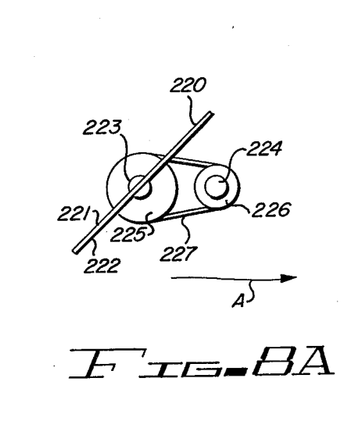
FIGS. 8A-8I is a sequence of semi-schematic illustrations which graphically represents the timing sequence associated with the embodiments of the instant invention.
Figure 8B:
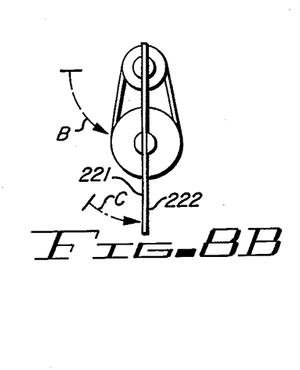
Figures 8C, 8D:
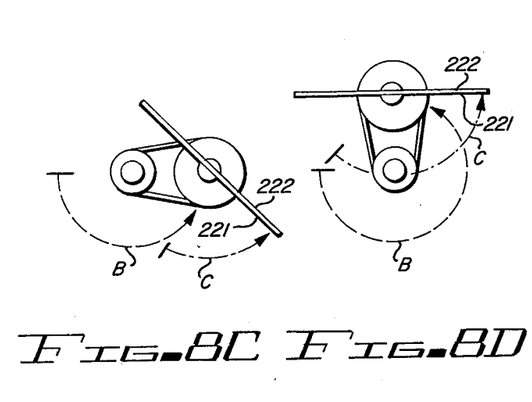
Figure 8E:
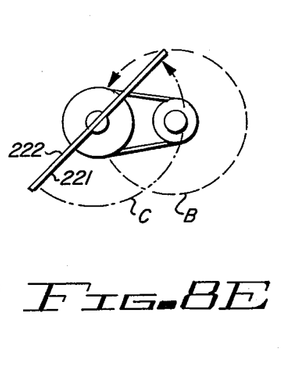
Figure 8F:
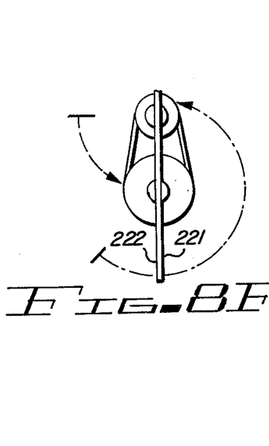
Figure 8G:
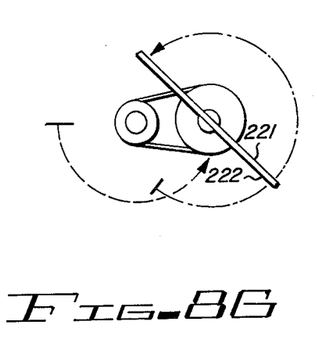
Figure 8H:
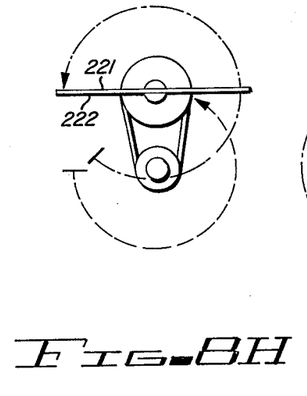

Referring first to FIG. 8A, the crank arm is parallel to the direction of the wind as designated by arrow A. The free end of the crank arm, that end which carries wind blade 220, extends into the wind. Wind blade 220 is at a 45° angle to the wind with the wind striking against face 221. The force of the wind against face 221 urges the appratus to the position as seen in FIG. 8B. Herein, the crank arm and wind blade 220 are perpendicular to the wind. During the movement the crank arm has rotated 90° about the axis thereof as designated by the length and direction of arrow B. Concurrently, wind blade 220 has rotated about the axis thereof 45° as indicated by the length and direction of arrow C. Subsequently, as seen in FIG. 8C, as the crank arm rotates an additional 90° for a total of 180°, wind blade 220 rotates and additional 45° for a total of 90°. The relative rotation is controlled by the timing means as previously described.

Figure 8I:
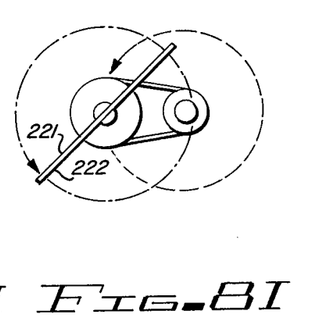

The instant series of illustrations, FIGS. 8A through 8I, are taken at subsequent times of rotation during which the crank arm has rotated a subsequent 90° and the wind blade has rotated an additional 45°. FIG. 8B is representative of a neutral position in which wind blade 220 is feathered and is moving against the wind. Immediately thereafter, as noted in FIG. 8E, face 222 is exposed in the wind. The continued rotation of the device with face 222 exposed to the wind continues through FIGS. 8F, 8G and 8H, at which time blade 220 is again feathered, face 221 exposed to the wind, and arrives at position as illustrated in FIG. 8I, corresponding to FIG. 8A.

During the rotation, the device has a power stroke as determined by the ability of wind blade 220 to receive wind and urge rotation of the crank arm. The power stroke for each revolution of the crank arm is approximately 225° commencing approximately 22½° prior to the illustration of FIG. 8A and terminating approximately 22½° subsequent to the illustration of FIG. 8C. The return stroke, during which time the wind blade is feathered, is approximately 135°. In accordance with FIG. 1, the blade is urged through the return stroke by a counterbalance. In accordance with FIG. 4, the yoke operates as a counterbalance. The blade is powered through the return stroke by a tandemly placed blade, as seen in the other embodiments.

Figures 9, 10, 11:
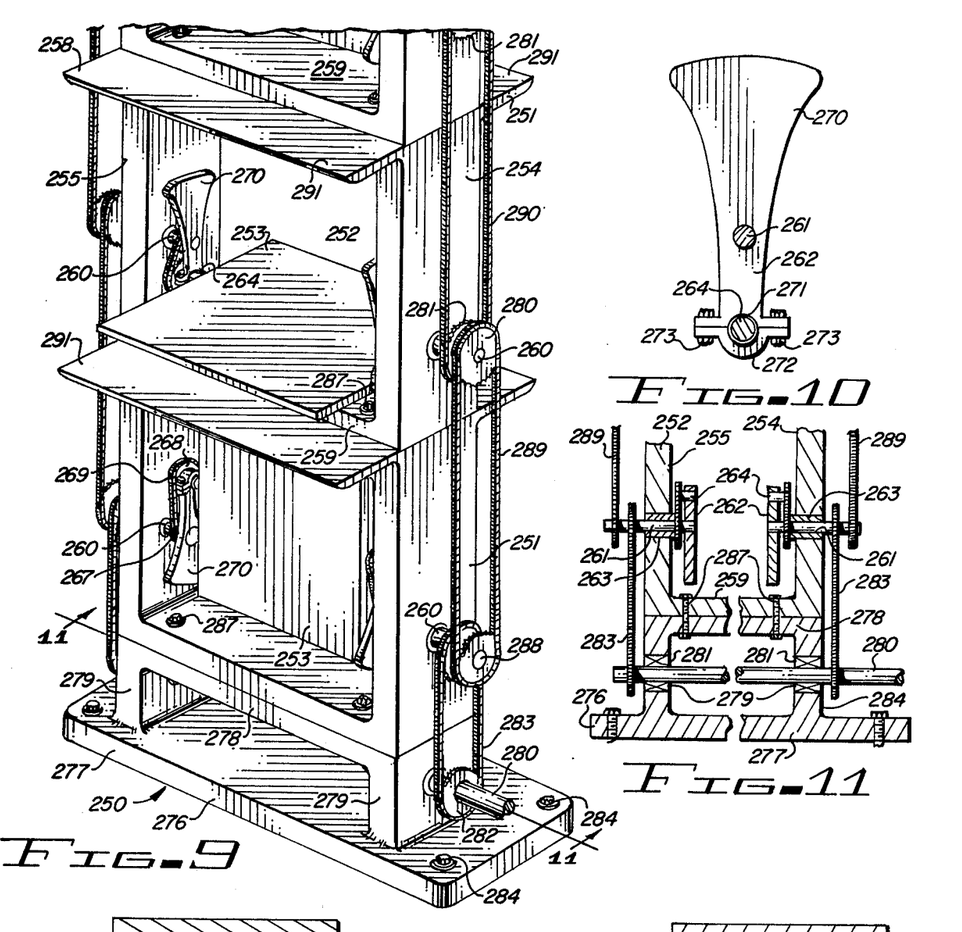
FIG. 9 is a partial perspective view of a wind motor in accordance with a modular concept of the instant invention.
FIG. 10 is an elevational view of a balancing means useful in connection with the instant invention, especially the embodiment of FIG. 9.
FIG. 11 is a vertical, sectional view, partially broken, and taken along line 11—11 of FIG. 9.

FIG. 9 illustrates a multi-blade wind motor, generally designated by the reference character 250, which is erected from a selected number of modular wind motor units 251. Each modular unit 251 is a self-contained single-blade wind motor, which is capable of functioning independent of the other modular units of the arrangement. Generally similar to the previously described embodiments of FIGS. 1 and 4, each modular unit 251 includes a frame 252 and a single wind blade 253. In accordance with an immediately preferred configuration, frame 252 is a generally rectangular parametric structure having spaced upright support members 254 and 255 joined by top and bottom support cross members 258 and 259, respectively.

Blade 253 is supported in frame 252 by a pair of crank members 260 which include crank shaft 261 and a crank arm 262 extending radially therefrom. Crank shafts 261 are rotatably journalled in frame 252 by bearings 263, as better viewed in FIG. 11.

Diametrically opposed axially aligned idler shafts 264 extend from opposite lateral edges of wind blade 253. Idler shafts 264 are rotatably journalled in respective crank arms 262. It is noted that the axes of rotation of crank shafts 261 and idler arms 264 are spaced and parallel. As previously described in detail, timing means including sprockets 267 and 268 and chain 269 maintain a predetermined radio between the speed of rotation of wind blade 253 and the speed of rotation of crank 261. Sprocket 267 is drivingly engaged with crank shaft 261 and sprocket 268 is drivingly engaged with idler shaft 264.

For purposes of expediency of manufacture, crank arm 262, as illustrated in FIG. 10, is an integral part of balance unit 270. Idler shaft 264 is rotatably journalled in bearing 271 and held by a cap 272 which is secured to crank arm 262 by conventional bolts 273. Removable cap 272 facilitates the removal, service and replacement of wind blade 253.

The moving or rotating mass of unit 251 generally includes wind blade 253, crank arm 262, the timing means and other readily apparent elements. The balance unit 270 provides dynamic balance for the moving mass and maintains the inertia of the unit. It is immediately apparent, therefore, that modular unit 251 is a self-contained single-blade wind motor. Output power can be taken directly from crank shaft 261.

Alternately, unit 251 may be mounted upon base unit 276. Base unit 276 includes base plate 277 and mounting pad 278 supported by upright members 279. Drive shaft 280 is suitably journalled for rotation in upright members 279 by bearings 281. Rotation is transmitted from modular unit 251 to base unit 276 by means of sprocket 281 secured to drive shaft 260, sprocket 282 drivingly engaged with drive shaft 280 and chain 283 drivingly engaged with sprockets 281 and 282. For reasons of mechanical balance two drive transmission units, including sprockets 281 and 282 and chain 283 are used, one on either side of modular unit 251.

Base plate 276 can be mounted to any suitable foundation, such as a concrete pad or a selected superstructure. The attachment is accomplished by anchor bolts 284 which extend through base plate 276 and engage the foundation. In locales where there is a prevailing wind from one of two opposite directions, base member 276 may be secured to a solid foundation. For multi-directional use, it is intended that base member 276 be secured to a rotating or turret platform. A rotating platform also provides protection for the unit in excessively heavy winds, since the unit can be rotated to present an edge to the wind and thus protect the wind blades.

The power output of drive shaft 280 can be increased in accordance with immediate needs by adjoining a plurality of modular units 251 in columnar fashion, as seen in FIG. 9. Bottom support member 259 is placed on, aligned with an secured to respective top support cross members 258 by any suitable means, such as bolts 287. To accommodate this arrangement, each crank shaft 261 carries a second drivingly engaged sprocket 288. Chain 289 drivingly and rotatably unites sprockets 288 of the lower two units. Chain 290, generally identical to chain 289, unites sprockets 281 of the second and third units. The chain and sprocket arrangement alternatingly repeats until all modular units have been drivingly united.

Substantially horizontal ledges project from either lateral edge of top support cross member 258. When blade 253 is in the vertical or nearly vertical position, wind is deflected therefrom. Ledges 291 prevent the deflected wind from the lower unit from having a detrimental or counter-rotating effect upon the blade 253 thereabove. As a secondary function, ledge 291 provides a rest for leaning a ladder thereagainst, as may be necessary during service operations.

In accordance with the embodiment as illustrated in FIG. 9, it is not necessary that wind motor 250 be stopped while a defective modular unit is repaired. It is only necessary that movement be temporarily ceased while a damaged blade is removed. The unit can be immediately returned to service after the blade is removed, since each modular unit 251 is a self-contained unit. It is within the scope of the instant invention that a simple clutch be incorporated into each drive shaft 261, whereby a malfunctioning unit may be removed from the system and serviced, while the other modular units continue to function. Obviously, when one unit is removed from service, there is a resultant loss of power at drive shaft 280. The lessening of power is considered to be preferential to the complete discontinuance of power during servicing, as is characteristic of prior art wind motors.

Figure 12:
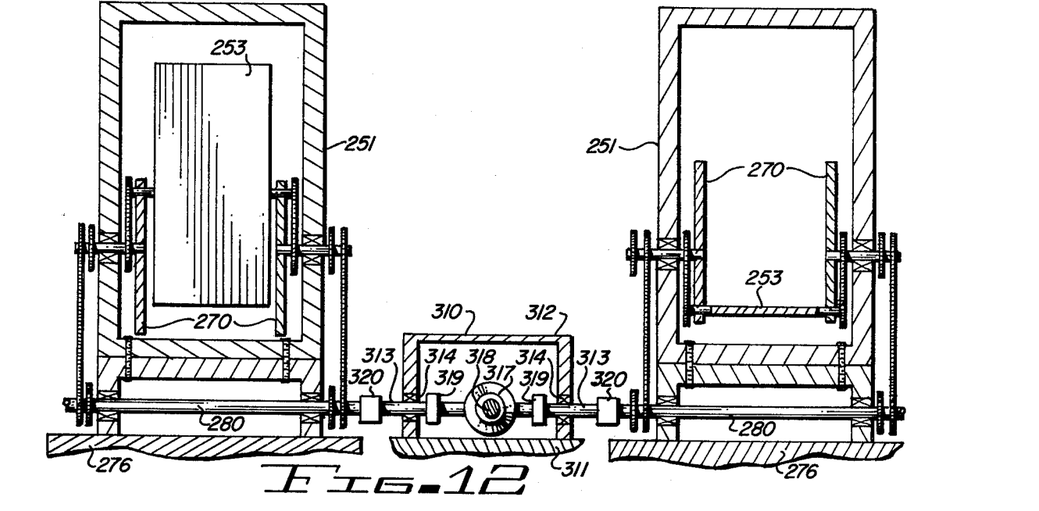
FIG. 12 is a vertical, sectional view of an alternate modular wind motor constructed in accordance with the teachings of the present invention.

FIG. 12 illustrates an alternate method of adjoining modular units 251. Provided is coupling module 310 having base plate 311 supporting frame 312. Shafts 313 are rotatably journalled in suitable bearings 314 held by frame 312. Shafts 312 provide power input to differential unit 317. Power output shaft 318 extends from differential unit 317. A brake unit 319 is associated with each shaft 313. Clutch units 320 couple shafts 313 with the appropriate drive shafts 280.

The advantage in coupling moduel 310 resides in that a plurality of modular units 251 may be adjoined to provide a single power output, as a multi-blade wind motor, in an overall structure having an exceedingly low profile. This arrangement is particularly adapted to certain locations having a particular type of prevailing wind. The units are also more readily available for servicing. Clutch and coupling units 320 provide that any selected unit may be readily removed from service as an individual module, without disrupting the function of the other modules associated in the wind motor.

As seen in FIG. 12, the left-hand and right-hand modules 251 are in a preferred mode of synchronization, having a 180° rotation relationship. For protection against excessive winds in a stationary application, the entire wind motor can be stopped at a point which will place one-half of the modular units 251 in a position as illustrated by the right-hand module. By disengaging clutch 320, the other units may be rotated to a similar position, and the clutch re-engaged. The units are brought to a stop and retained from further rotation after setting in the appropriate position by means of brake units 319. After the emergency wind situation has passed, the various blades are again synchronized, utilizing clutch units 320.

It will be appreciated that additional modular units 251, as desired, may be incorporated into a single wind motor in accordance with either of two schemes. In the first arrangement, additional coupling modules 310 are engaged with the opposite ends of drive shafts 280 as shown, and additional modular units 251 attached thereto. In a file arrangement, additional modular units 251 are placed one behind the other in the direction of the prevailing wind. The units can be placed two-by-two, with a coupling module 310 therebetween, as described above. In turn, drive shafts 318 are coupled to provide a single power output.

Reviewing the objectives of the instant invention, it is immediately apparent that due to the unique tandem arrangement of the blades each blade is fully exposed to the wind. It is equally apparent that each blade is independent of the influence of wind deflected by another blade. Sequentially tracing the projection set forth in FIGS. 1, 2, 3 and 4, it is seen that the instant invention presents a modular arrangement of a single blade which may be combined with other modular arrangement to provide wind motors having two, four, six or any practical plurality of blades. The modular concept is further expanded by the embodiments described in connection with FIGS. 9-12. Further, speed and torque multiplication factors are readily achieved by variance of the length of the crank arm. A relatively short crank arm will provide a high speed unit, while lengthening the crank arm will provide a lower speed with increased torque.

Various changes and modifications to the embodiments herein specifically chosen for purposes of illustration will readily occur to those skilled in the art. For example, the wind blade has been graphically illustrated as a flat, rectangular panel. In accordance with an alternate embodiment, the wind blade may comprise a parametric frame of any desired configuration having a sail contained therein. A preferred wind blade, especially for use in combination with the embodiments of FIGS. 9-12, is a pair of spaced elongate sized members. One member is carried by each idler shaft and sail cloth is extended therebetween. Additional cloth supporting members may extend between the elongate members and be flexibly attached thereto. Advantageously, cibration in the unit is substantially reduced. It is also contemplated that each modular unit 251 can incorporate a drive shaft 280 in a manner analogous to the embodiment of FIG. 4. Also, the faces of the blade may be contoured to alter the wind gathering characteristics. Similarly, while it is apparent that the devices will also respond to wind from a direction opposite that shown in FIG. 8A and thus inherently bi-directional, the stationary frame may be provided with a rotatable base. The rotatable base being made responsive to a wind direction vane either through mechanical or electro-mechanical means provides a device which is completely multi-directional.

Having fully described and disclosed the present invention and the preferred embodiments thereof in such clear and concise terms as to enable those skilled in the art to understand and practice the same, the invention claimed is:

1. A wind motor for receiving the force of the wind and for translating the generally linear movement thereof to rotary motion, said wind motor comprising:
   (a) a stationary frame;
   (b) a crank member including
      (i) a crank shaft journalled in said frame for rotation about a first axis, and
      (ii) a crank arm extending radially from said crank shaft;
   (c) a wind blade carried by said crank arm and rotatable about a second axis spaced from and parallel to said first axis;
   (d) timing means for maintaining a predetermined ratio between the speed of rotation of said wind blade about said second axis and the speed of said crank shaft about said first axis; and
   (e) balance means rotatable in response to rotation of said crank member for dynamic balance of the moving mass of said wind motor,
   whereby said wind motor is self-contained, single blade, modular unit.

2. The wind motor of claim 1, further including a second crank member axially aligned and cofunctioning with said first crank member, said second crank member including a second crank shaft and a second crank arm; and a second wind blade carried by said second crank arm.

3. The wind motor of claim 1, further including a driveshaft journalled in said frame and rotatable in response to rotation of said crank member.

4. The wind motor of claim 1, in combination with:
   (a) a base module including
      (i) a frame member,
      (ii) a driveshaft rotatably journalled in said frame member, and
      (iii) mounting means for engageably receiving and carrying said wind motor; and
   (b) drive means for transmitting rotation of said crank shaft to said driveshaft.

5. The wind motor of claim 1, further including:
   (a) means for attaching said wind motor to a second said wind motor,
      whereby a selected number of said wind motors are joinable as modular units to form a multi-blade wind motor, each said blade receiving the full force of the wind; and
   (b) coupling means for rotatably interconnecting the crank shafts of the several said adjoined wind motor modular units.

6. The wind motor of claim 5, further including clutch means for selectively engaging and disengaging said coupling means, whereby a selected modular unit may be functionally disengaged from said multi-blade wind motor.

7. The wind motor of claim 2 in which the axes of said crank shafts are aligned and substantially horizontal.

8. The wind motor of claim 1 in which said wind blade has opposed side edges and said crank arm is connected to said wind blade at one of said side edges and the crank shaft is positioned on a horizontal axis, together with a second crank member including a crank arm connected to the other side edge of said wind blade and a second crank shaft journaled in said frame on a horizontal axis in alignment with the horizontal axis of the first said crank shaft.

9. The wind motor of claim 8, together with a second wind blade having opposed side edges and connected to the crank arms of an additional pair of crank members having crank shafts journaled in said frame on aligned horizontal axes spaced vertically from the horizontal axes of the first said crank shafts.

10. The wind motor of claim 1 in which said balance means comprises a second wind blade mounted on said frame in tandem with the first said wind blade and at an angle of 90° degrees relative thereto.

* * * * *